US012664053B2

(12) United States Patent
Baldwin et al.

(10) Patent No.: US 12,664,053 B2
(45) Date of Patent: Jun. 23, 2026

(54) SECURITY INSPECTIONS

(71) Applicant: Hewlett-Packard Development Company, L.P., Spring, TX (US)

(72) Inventors: Adrian John Baldwin, Bristol (GB); Stuart Lees, Bristol (GB); Jonathan Griffin, Bristol (GB); Daniel Ellam, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 1023 days.

(21) Appl. No.: 17/755,013

(22) PCT Filed: Nov. 22, 2019

(86) PCT No.: PCT/US2019/062759
§ 371 (c)(1),
(2) Date: Apr. 19, 2022

(87) PCT Pub. No.: WO2021/101562
PCT Pub. Date: May 27, 2021

(65) Prior Publication Data
US 2022/0382636 A1     Dec. 1, 2022

(51) Int. Cl.
*H04L 29/06*        (2006.01)
*G06F 11/07*        (2006.01)
*G06F 11/14*        (2006.01)

(52) U.S. Cl.
CPC ...... *G06F 11/1415* (2013.01); *G06F 11/0766* (2013.01); *G06F 2201/84* (2013.01)

(58) Field of Classification Search
CPC ............. G06F 11/1415; G06F 11/0766; G06F 2201/84; G06F 9/4401; G06F 9/4406; G06F 21/572; G06F 21/575; H04L 63/14
See application file for complete search history.

(56) References Cited

U.S. PATENT DOCUMENTS

| | | | | |
|---|---|---|---|---|
| 7,127,602 | B1 * | 10/2006 | Bakke | .................. G06F 9/4416 |
| | | | | 709/222 |
| 7,363,356 | B1 * | 4/2008 | Rissmeyer | .......... H04L 61/5014 |
| | | | | 709/217 |
| 7,788,477 | B1 | 8/2010 | Huang et al. | |
| 8,473,588 | B2 | 6/2013 | Peterson et al. | |
| | | (Continued) | | |

FOREIGN PATENT DOCUMENTS

| | | | |
|---|---|---|---|
| CN | 107567616 | A | 1/2018 |
| CN | 108829410 | A | 11/2018 |
| | (Continued) | | |

*Primary Examiner* — Shawnchoy Rahman
(74) *Attorney, Agent, or Firm* — Quarles & Brady LLP

(57)            ABSTRACT

In some examples, a method for performing an out-of-band security inspection of a device comprises generating a snapshot of the state of the device, storing data representing the snapshot to a non-volatile storage of the device, and storing a hash of the snapshot in a device BIOS, transitioning the power state of the device, triggering boot of a trusted diskless operating system image, providing the data representing the snapshot and the hash of the snapshot to the trusted diskless operating system image, and executing a script selected on the basis of a trigger event and the hash of the snapshot to analyse at least a portion of the non-volatile storage of the device.

20 Claims, 2 Drawing Sheets

(56) References Cited

U.S. PATENT DOCUMENTS

| | | | |
|---|---|---|---|
| 8,909,746 | B2 | 12/2014 | Currid et al. |
| 10,348,705 | B1 | 7/2019 | Volkanov et al. |
| 2007/0143611 | A1* | 6/2007 | Arroyo ............... H04L 63/0428 |
| | | | 713/171 |
| 2009/0319782 | A1 | 12/2009 | Lee |
| 2011/0060947 | A1 | 3/2011 | Song et al. |
| 2011/0078799 | A1 | 3/2011 | Sahita et al. |
| 2015/0058640 | A1* | 2/2015 | Balakrishnan ........ H04L 9/3236 |
| | | | 713/193 |
| 2016/0350130 | A1 | 12/2016 | Tabone et al. |
| 2017/0116420 | A1* | 4/2017 | Rubakha ............... G06F 21/568 |
| 2017/0180191 | A1 | 6/2017 | Coburn et al. |
| 2018/0096260 | A1 | 4/2018 | Zimmer et al. |
| 2018/0136940 | A1 | 5/2018 | Mallichan et al. |
| 2018/0285180 | A1 | 10/2018 | Teshome et al. |
| 2018/0285385 | A1 | 10/2018 | West et al. |

FOREIGN PATENT DOCUMENTS

| | | | |
|---|---|---|---|
| CN | 110325964 A | 10/2019 | |
| WO | 2016/196683 A1 | 12/2016 | |
| WO | WO-2018054473 A1 * | 3/2018 | ........... G06F 21/575 |

* cited by examiner

SECURITY INSPECTIONS

BACKGROUND

A user device can become inoperable or compromised for a number of reasons. For example, a device operating system that is provided on a local storage of the device may become corrupted due to general filesystem or upgrade issues, or may become infected by malware.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

Figure 1:
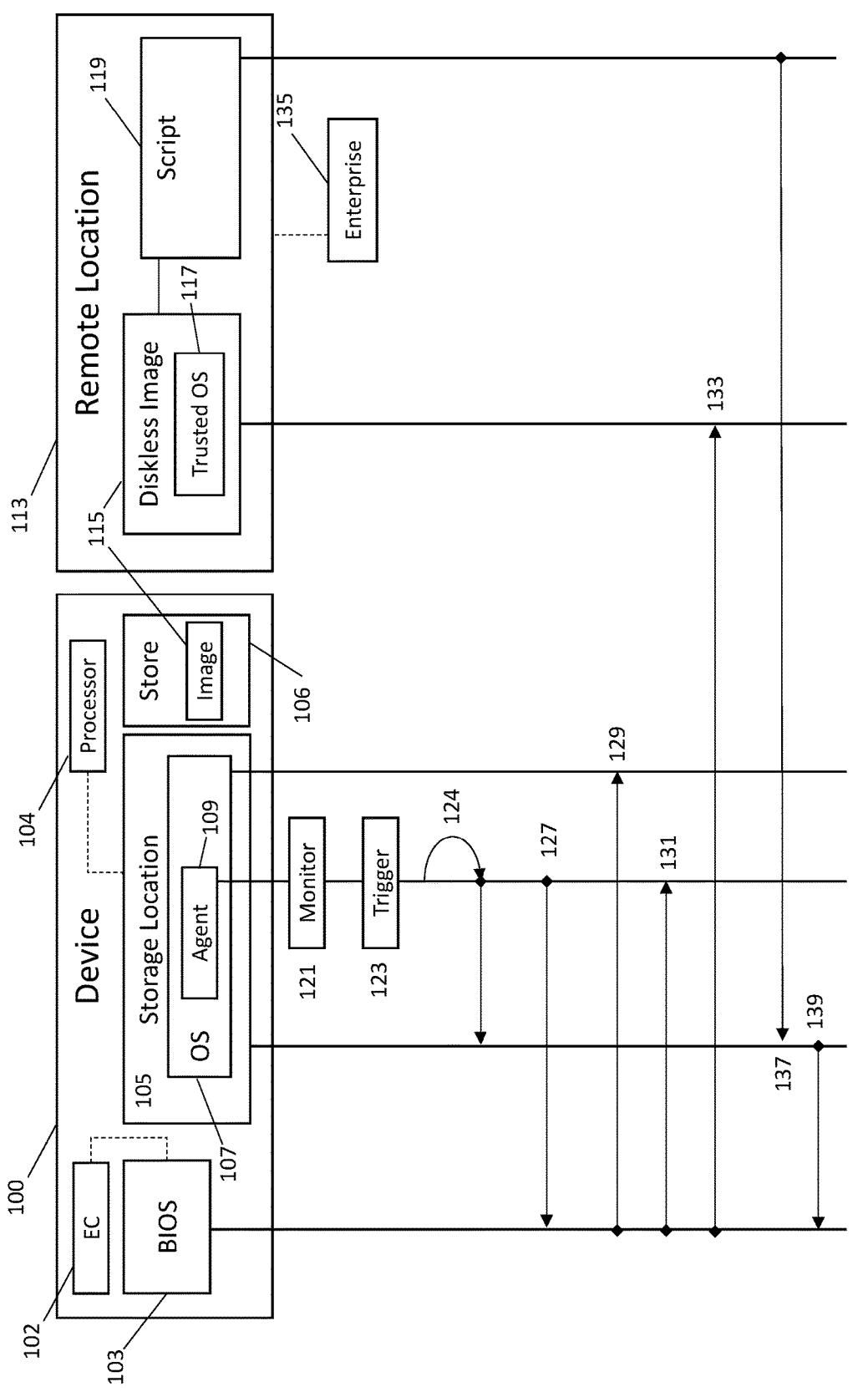
FIG. 1 is a schematic representation of a method for data management according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

An endpoint device, such as a user device in the form of a computer, laptop or other computing or smart apparatus for example, may be able to use a variety of different operating systems. In general, such operating systems are provided on a local storage location of the device in question.

Operating systems are continually under attack from various actors wishing to find an exploit that lets them run their own software or malware, such as but not limited to, remote access trojans, ransomware or cryptocurrency miners. There also can be other issues, software or hardware, that render the endpoint device compromised, unbootable or unusable.

Once an OS (operating system) is compromised, an attacker may gain full administrator or kernel level access, thereby enabling them to control systems on the platform such that Antivirus systems (which may otherwise report that everything is ok), and other checks and controls can be subverted by the attacker to hide them from detection. For example, malware can hook into various operating system APIs to try and hide from processes running from within the OS or to manipulate OS structures so that evidence of malware is not reported.

According to an example, a user, IT or Security staff, or a system or device itself, can hibernate (or reboot) its main OS and launch a secured augmented trusted diskless operating system image via a device hardware component, e.g., firmware, of the device. In an example, the device hardware component can be used to perform device hardware initialization during a boot process. The device hardware component can also provide runtime services for operating systems and programs, and will typically be a pre-installed component on the device. Such a device hardware component can be referred to as a BIOS (basic input/output system), and may be provided in the form one or more components such as integrated circuits. References herein to BIOS represent any suitable device hardware component that can be used to perform device hardware initialization during a device boot process.

In an example, the secured augmented trusted diskless operating system image can be provided with information from the main OS so that it is able to examine the main OS storage location of the device, and the normal boot operating system for problems and fix them as required, without execution of the compromised operating system and/or possible malware contained on the storage.

In an example, an automatic or forced boot into a trusted diskless image for security scanning may be due to, for example, an agent on the operating system detecting a potential compromise (or repeated suspicious behaviours), and/or an IT (information technology) Admin or IT security staff detecting suspicious behavior from device monitoring (such as using an endpoint detection and response/antivirus EDR/AV tool) or from network traffic or even due to the locations that someone has visited, and/or a user being suspicious due the way a device is functioning (or not functioning), and/or an installed operating system no longer booting, or crashing at start up and the user therefore wanting to run a check (as above). This could include cases where for example, the MBR (master boot record) is corrupted, and/or the fact that there appears to be a BIOS level attack, leading the agent to recover the BIOS.

FIG. 1 is a schematic representation of a method for performing an out-of-band security inspection of a device according to an example. A device 100 comprises a BIOS 103 and a storage location 105 (which can comprise e.g. disc or flash-based storage, CD-ROM, optical storage, etc.). The storage location 105 stores a device OS 107, which may include a security agent 109. A remote (from device 100) location 113 comprises a trusted diskless boot image 115. In an example, the trusted diskless boot image 115 includes a trusted augmented operating system 117.

An agent 109 can monitor 121 for certain activity within the OS 107. In the example of FIG. 1, the agent can be provided as part of the OS 107 stored in a storage location 105 of the device 100. The storage location of the device can include a hard disk drive, tape drive, floppy disk, optical disc, or USB flash drive and so on. Agent 109 can detect issues, ingest detection events, and receive commands, such as from an administrator as part of an enterprise 135. In an example, there is a trusted relationship between the platform (BIOS 103 or EC 102) and the agent 109.

In an example, a security detection by agent 109 or a notification from an admin received by agent 109 can trigger 123 the agent to execute 124 one or more scripts within the OS 107 and save data resulting from the execution of the script or scripts to disk 105. This enables the agent 109 to take a snapshot of how the potentially subverted OS 107 is seeing the state of the device 100. As data is written to disk 105 the agent 109 can keep a hash of what is written and/or write the hash to BIOS 103. This can be a running hash of a file but it could be organized as a hash tree depending on the volumes and complexity of the data.

In an example, agent 109 can then send 127 a security event to the BIOS 103, e.g. via a windows management instrumentation WMI call. The BIOS 103 can then force 129 the OS 107 to hibernate or force a reboot (through the ACPI (Advanced Configuration and Power Interface) power management interface). The BIOS 103 can the trigger a boot of an alternative trusted diskless OS image 115 that has been customized to run a security script 119 with limited user interactions. For example, the BIOS 103 can instruct 131 agent 109 to boot a pre-installed trusted OS diskless boot image from a local location 106. The trusted OS diskless boot image 115 can be stored in a local but non-OS storage location 106 or could be downloaded 133 as required (from the remote location 113).

In an alternative example, a user of device 100 can reboot or hibernate the device 100. On restart of the device they could (e.g. via a BIOS 103 menu) be offered the ability to run the secure agent 109. In this case there will be no supporting information from the OS based agent (or the OS based agent could regularly maintain a fresh set of supporting data). In this case the agent 109 may not be a component of the device 100.

In an example, BIOS 103 can be configured with the location 113 to obtain image 115, or the location of any local image store 106, and security information comprising a public key used to sign the image 115, and image version information or a hash of the current image. These values can be securely managed and stored in the BIOS 103. In an example, BIOS 103 can check that the image is an approved image using this security information.

The BIOS 103 can make available any security event information provided by the agent 109 (or an IT admin via the agent 109 for example) along with the hash of any data written to the disk 105. If boot into the image 115 is triggered through an event detected by agent 109 (and corresponding BIOS configuration) then event information recorded by agent as described above can be made available. This may be communicated via WMI or through UEFI variables for example.

According to an example, the trusted diskless OS image 115 is configured to execute a script 119. The script 119 can use the event information to determine a level of security checks to perform. In doing so a user can be prompted to provide answers to additional questions, download additional scripts (either defined within the OS image or via a location (and authenticated with a certificate) as specified within the BIOS configuration and provided to the security scanning OS.

As part of the operation of the script 119, the main OS disk 105 can be mounted 137 (using any necessary e.g. bitlocker recovery keys). The security scanning OS 117 can then run a number of operations. For example, the script 119 can trigger:

execution of an AV scan on all files on the disk 105 (or just certain areas of the disk);

analysis of the device registry looking for "startups" (i.e. things that start when the OS starts) and remove any in a non-approved list (creating scripts to reverse if necessary);

perform "inside/outside" checking using the information written by the OS agent 109.

For example, the script can check whether the data on the disk 105 matches the hash provided by the BIOS. This may then allow checks that, for example: determine whether registry entries reported in the OS match those in the registry hive files (only accessible due to booting into an alternative OS); check file system entries correspond to those reported through the e.g. windows APIs; if the system has been hibernated checks could be run on the hibernate file that contains a memory dump. Here, kernel structures could be compared with those reported by the OS agent. Other scripts looking for known malware can be run.

In an example, OS configuration can be checked and repaired (including those for an AV system). The integrity of operating system files can be checked against a list of good file hashes. Other scripts looking at installed applications can be executed to look for unwanted programs Any security issues detected within the security scan can be logged. In addition, in an example, cleanup scripts can be run, for example, to delete files (even those in hard to access system folders) or to correct registry entries via editing the registry hive files. Specific clean up scripts can also be run or potentially suspect files or configurations repaired.

In an example, the results of this security scanning and fixing can be logged on the disk 105 and a hash created (or they could be communicated back to a central server, e.g. of remote location 113 or enterprise 135). Assuming the log is written to disk (i.e. the main OS disk 105) the hash of this log can be sent back 139 to the BIOS 103. On reboot into the main OS 107 (now repaired) agent 109 can be given the hash of the log file (for example, through a heart-beat mechanism) and can check on actions performed, and inform the user and IT administrators/services and so on.

In the examples of the agent 109 communicating the hash of the data to the BIOS as step 127 or getting the hash of any scanning results back over step 139 this can take advantage of any secure communications or secured heartbeat between the OS based agent and the BIOS 103 or the EC 102. This provides additional assurance as to the source of the data (or hash of the data).

Therefore, according to an example, if an OS 107 on a local disk 105 is suspected of being infected by malware, or is otherwise compromised, a trusted external image can be used to execute a script that can perform scans, patches and repairs and so on without using the compromised OS 107.

According to an example, a trusted diskless boot image used for reimaging or storage management can be specified within the device BIOS. For example, a location of such an image can be specified in the BIOS. Alternatively, the BIOS can offer the ability to execute a secure agent that can be configured to download or mount the trusted diskless boot image from a specified location, which can be remote from the device. In an example, the BIOS, secure agent, or a secure enclave of the device, such as a trusted platform module for example, can store data representing one or more of the location of the trusted diskless boot image, a public key used to sign the image, and a hash of the trusted diskless boot image. The BIOS, for example, can compare the hash of the trusted diskless boot image with a hash of a trusted diskless boot image retrieved from a remote location in order to validate any downloaded/mounted image.

In an example, the device user or an enterprise may trigger a boot or mount of an OS of the trusted diskless boot image. For example, upon receipt of a Windows Management Instrumentation (WMI) call, or similar for other systems, the device BIOS can be configured to force the device to change operational or power state, e.g. to hibernate or reboot through an ACPI power management interface. The BIOS can be configured to then trigger boot of the trusted diskless boot image, which can be provided at a remote location from the device, using one of the mechanisms described above for example.

According to an example, when booted, a trusted diskless boot image can execute a script which connects to the main OS drive of the device in order to enable e.g. an enterprise specified (or user chosen) data analysis, repair or backup script to be executed. In an example, such a script can be integrated into a recovery agent provided as part of the OS or BIOS.

In an example, when an endpoint device 100 is securely booted using a trusted diskless boot image 115 providing a trusted augmented operating system 117 data can be written to a storage location 105 of the device using an encryption key for reading data from the storage location, thereby maintaining security of the user's and enterprise data. In an example, the encryption key can be received from a remote location.

In an example, trigger 123 may be automatically generated by agent 109, or either by way user input (e.g. device user, or a third party such as an enterprise security controller), or directly by a user via the OS 107 (e.g. the device user, or a third party such as an enterprise security controller).

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, agent 109) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 2:
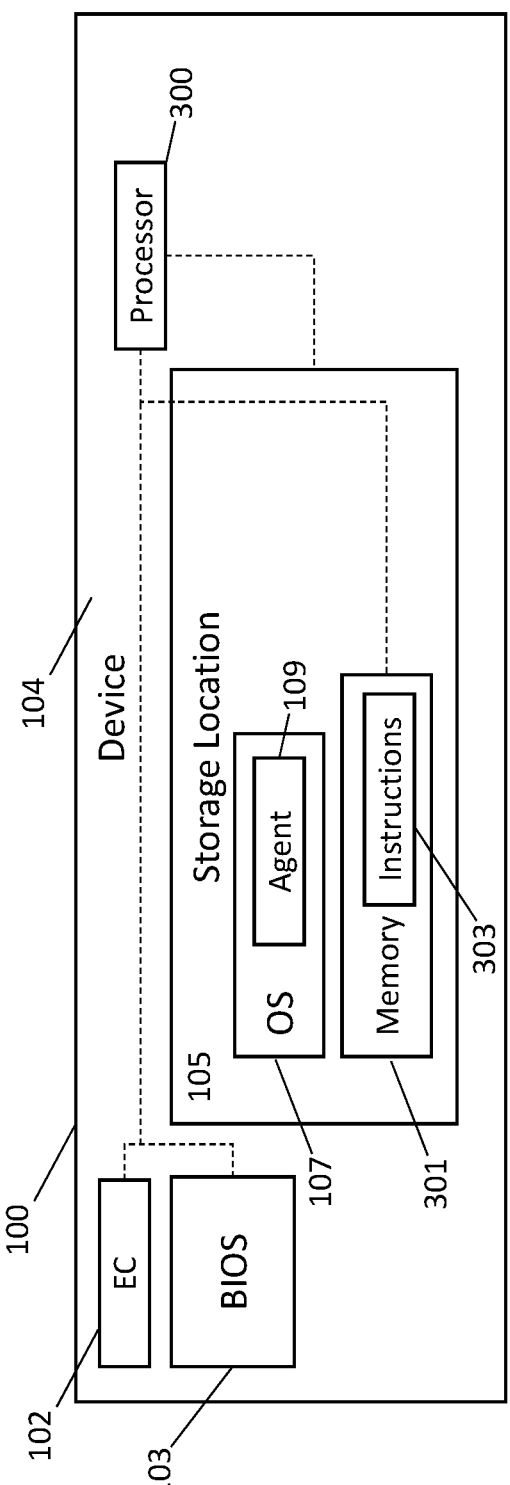
FIG. 2 is a schematic representation of a device according to an example.

FIG. 2 is a schematic representation of a device according to an example. Device 100 comprises a processor 300 associated with a memory 301. The memory 301 comprises computer readable instructions 303 which are executable by the processor 300. The instructions 303 can comprise instructions to perform an out-of-band security inspection of the device 100, by generating a snapshot of the state of the device; storing data representing the snapshot to a non-volatile storage 105 of the device, and storing a hash of the snapshot in a device BIOS 103; transitioning the power state of the device (e.g. rebooting or hibernating the device); triggering boot of a trusted diskless operating system image 115; providing the data representing the snapshot and the hash of the snapshot to the trusted diskless operating system image; and executing a script 119 selected on the basis of a trigger event and the hash of the snapshot.

Such machine readable instructions 303 may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in FIG. 1.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for performing an out-of-band security inspection of a device, the method comprising:
   generating a snapshot of a state of the device;
   storing data representing the snapshot to a non-volatile storage of the device;
   storing a hash of the snapshot in a basic input/output system (BIOS) of the device;
   transitioning a power state of the device;
   triggering boot of a trusted diskless operating system image;
   providing the data representing the snapshot and the hash of the snapshot to the trusted diskless operating system image; and
   executing a script selected based on a trigger event and the hash of the snapshot to analyze at least a portion of the non-volatile storage of the device.

2. The method as claimed in claim 1, further comprising:
   executing a data collection process in response to the trigger event.

3. The method as claimed in claim 1, wherein the trigger event comprises one of a security detection or user intervention.

4. The method as claimed in claim 1, further comprising:
   mounting the non-volatile storage of the device from the trusted diskless operating system image.

5. The method as claimed in claim 1, wherein transitioning the power state of the device comprises forcing a reboot of the device from a current state of operation of the device.

6. The method as claimed in claim 1, further comprising mounting the trusted diskless operating system image from a local storage location of the device, wherein the local storage location is separate from the non-volatile storage of the device.

7. The method as claimed in claim 1, further comprising communicating results of the analysis of at least the portion of the non-volatile storage of the device to an agent by way of data written to a disk and a second hash sent via the BIOS.

8. A device, comprising:
a non-volatile storage;
a basic input/output system (BIOS); and
a processor to:
    generate a snapshot of a state of the device;
    store data representing the snapshot to the non-volatile storage;
    store a hash of the snapshot in the BIOS;
    transition a power state of the device;
    trigger boot of a trusted diskless operating system image, the trusted diskless operating system image comprising a trusted diskless operating system;
    provide the data representing the snapshot and the hash of the snapshot to the trusted diskless operating system; and
    execute a script provided as part of the trusted diskless operating system to perform an out-of-band security inspection of at least a portion of the non-volatile storage.

9. The device as claimed in claim 8, wherein the processor is to transition the power state of the device in response to a trigger.

10. The device as claimed in claim 8, wherein the processor is to download the trusted diskless operating system image from a remote storage, the location of which is configured in the BIOS.

11. The device as claimed in claim 8, wherein the processor is to mount the trusted diskless operating system from a local storage location of the device, and wherein the local storage location is separate from the non-volatile storage of the device in which a main operating system of the device is installed.

12. The device as claimed in claim 8, wherein the processor is to execute a secure agent to download the trusted diskless operating system image from a remote location.

13. The device as claimed in claim 12, wherein the processor is to compare a hash of an expected trusted diskless operating system image with a hash of the trusted diskless operating system image retrieved from the remote location.

14. A non-transitory machine-readable storage medium encoded with instructions executable by a processor of an apparatus to cause the apparatus to:
    generate a snapshot of a state of the apparatus;
    store data representing the snapshot to a non-volatile storage of the apparatus;

store a hash of the snapshot in a basic input/output system (BIOS) of the apparatus;
    change an operational state of the apparatus;
    trigger boot of a trusted diskless operating system image;
    provide the data representing the snapshot and the hash of the snapshot to the trusted diskless operating system image; and
    analyze at least a portion of the non-volatile storage of the apparatus based on information provided as part of a script that is provided as part of the trusted diskless operating system image.

15. The non-transitory machine-readable storage medium as claimed in claim 14, wherein the instructions are executable by the processor of the apparatus to cause the apparatus to:
    download the trusted diskless operating system image from a remote location.

16. The non-transitory machine-readable storage medium as claimed in claim 14, wherein the instructions are executable by the processor of the apparatus to cause the apparatus to:
    trigger the boot of the trusted diskless operating system image in response to a security event recognized by the BIOS.

17. The non-transitory machine-readable storage medium as claimed in claim 16, wherein the instructions are executable by the processor of the apparatus to cause the apparatus to:
    execute the script to analyze at least the portion of the non-volatile storage of the apparatus based on the security event and the hash of the snapshot.

18. The non-transitory machine-readable storage medium as claimed in claim 14, wherein the instructions are executable by the processor of the apparatus to cause the apparatus to:
    mount the non-volatile storage of the apparatus from the trusted diskless operating system image.

19. The method as claimed in claim 1, further comprising:
    retrieving the trusted diskless operating system image from a remote location configured in the BIOS of the device.

20. The device as claimed in claim 9, wherein the processor is to select the script based on the trigger and the hash of the snapshot.

\* \* \* \* \*